United States Patent [19]
Perron

[11] Patent Number: 5,983,000
[45] Date of Patent: Nov. 9, 1999

[54] APPARATUS FOR PATCHING A CONTROL PROGRAM IN A PROCESSOR

[75] Inventor: Olivier Perron, Franconville, France

[73] Assignee: Alcatel, Paris, France

[21] Appl. No.: 09/090,161

[22] Filed: Jun. 4, 1998

[51] Int. Cl.[6] ............................................. G06F 9/42
[52] U.S. Cl. .............................................. 395/182.06
[58] Field of Search ..................... 364/DIG. 1 MS File, 364/DIG. 2 MS File; 395/181, 182.01, 182.03, 182.06–183.05, 183.11, 183.14, 183.18, 567, 568, 590, 591, 652, 653, 678

[56] References Cited

U.S. PATENT DOCUMENTS

| | | | |
|---|---|---|---|
| 4,802,119 | 1/1989 | Heene et al. | 395/182.05 |
| 4,928,237 | 5/1990 | Bealkowski | 395/653 |
| 5,193,161 | 3/1993 | Bealkowski et al. | 711/206 |
| 5,404,527 | 4/1995 | Irwin et al. | 395/200.52 |
| 5,796,974 | 8/1998 | Goddard et al. | 395/387 |

FOREIGN PATENT DOCUMENTS

0458559A2  11/1991  European Pat. Off. .
0553733A2  8/1993  European Pat. Off. .

*Primary Examiner*—Robert B. Harrell
*Attorney, Agent, or Firm*—Sughrue, Mion, Zinn, Macpeak & Seas, PLLC

[57] ABSTRACT

Apparatus for patching a control program in a processor which executes a control program stored in non-volatile memory, and which has access to a plurality of patch routines. The apparatus comprises storage for storing trap addresses each of which is associated with the address of a patch routine; a comparator for comparing the address of the program counter with the patch addresses; and a diverter for responding to a positive comparison by diverting the control program to the patch routine whose address is associated with the trap address that gave rise to the positive comparison. Each trap address is associated with one of the possible operating states of the processor. The apparatus includes a selector for selecting a predetermined number of trap addresses from the trap addresses stored in the storage so as to select trap addresses that are associated with the current operating state of the processor. The comparator compares the address in the program counter with the selected addresses only.

14 Claims, 3 Drawing Sheets

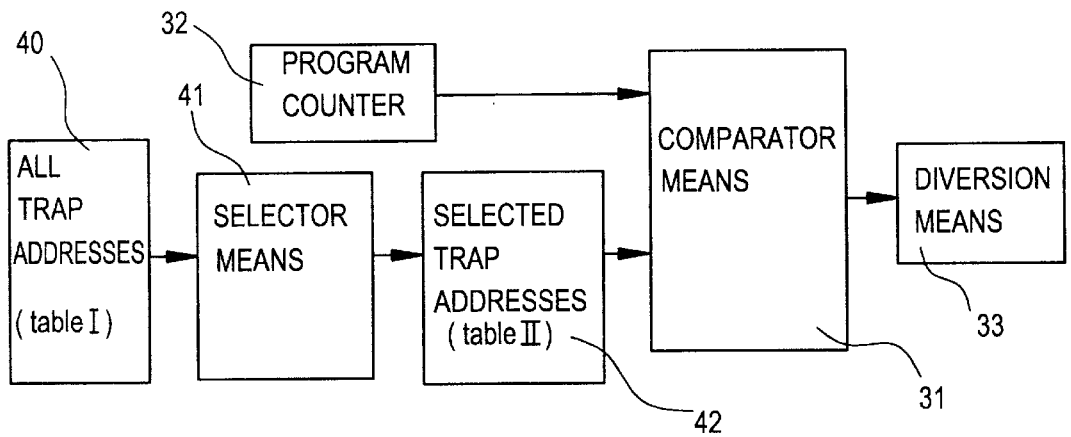

FIG. 7
| Row No. in table II | Permanent | Mode 1 | Mode 2 | Mode 3 | Mode 4 |
|---|---|---|---|---|---|
| 1 | Routine A | ✕ | ✕ | ✕ | ✕ |
| 2 | Routine B | ✕ | ✕ | ✕ | ✕ |
| ⋮ | ⋮ | ⋮ | ⋮ | ⋮ | ⋮ |
| 7 | ✕ | Routine C | Routine D | Routine E | Free |
| 8 | ✕ | Free | Routine F | Routine G | Free |
FIG. 8
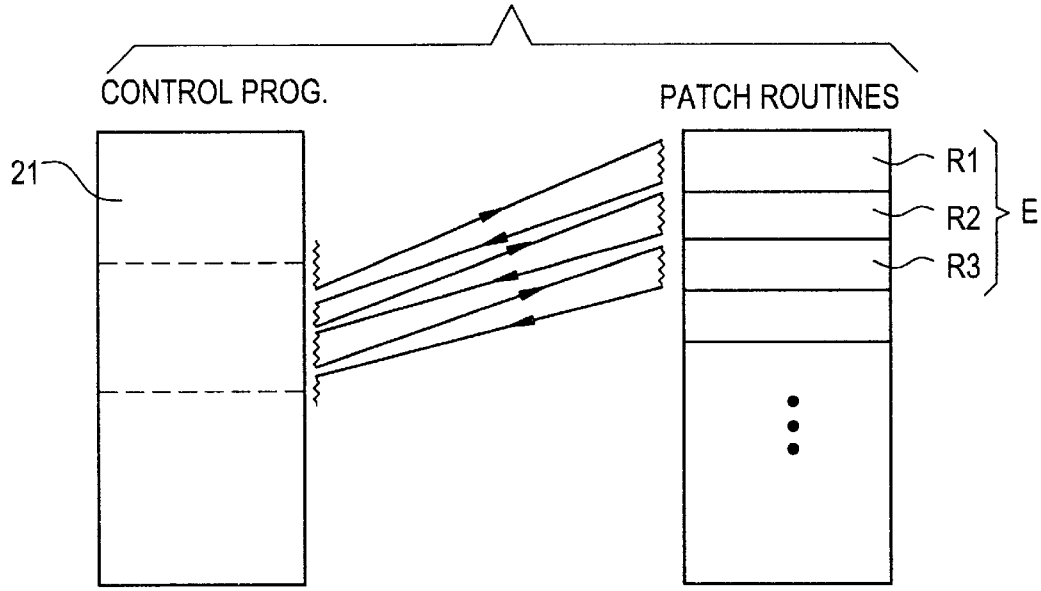
FIG. 9
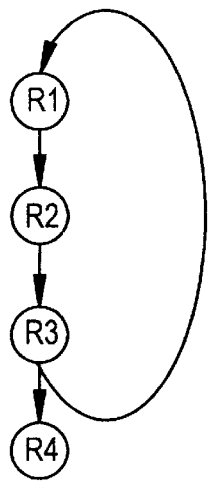

APPARATUS FOR PATCHING A CONTROL PROGRAM IN A PROCESSOR

The field of the invention is that of correcting program errors in a processor. More precisely, the invention relates to apparatus for patching the control program in a processor.

BACKGROUND OF THE INVENTION

The processors or microprocessors presently in use perform their operations in compliance with the instructions of a control program (or code) which is generally to be found in non-volatile memory of the ROM type. The control program is "masked", i.e. it is made during manufacture of the integrated circuit by the masking technique.

Because of errors in certain instructions of the control program in non-volatile memory, or because the control program needs to be modified, it can happen that it is desired to perform one or more patches, each consisting in replacing the erroneous instruction or sequence of instructions or modified instructions by a replacement routine which is known as a "patch".

If the control program were stored in read/write memory or RAM, or indeed in electrically programmable read-only memory (EPROM), then actual replacement would indeed be possible. However, in the present case, because the control program is in (masked) non-volatile memory, such actual replacement is not possible.

Conventionally, a control program stored in ROM is patched by diverting the control program while it is running to a corrected or modified patch stored in RAM and generally located outside the chip on which the processor and the ROM are formed.

In a known technique, branching instructions are inserted at regular intervals in the control program. Executing each branching instruction amounts to diverting (first jump) the execution of the control program to an address which is situated in RAM and which contains a jump instruction (second jump):

either to the address of a patch routine, supposing that certain instructions in the control program following the branching instruction include errors or need to be modified;

or else, in the absence of errors, to a return address in the control program immediately following the address of the branching instruction.

In other words, the address of each branching instruction constitutes a predefined trap address and corresponds necessarily to two jumps.

That known technique suffers from several drawbacks. Firstly, it increases the real time constraints on the control program since two jumps need to be executed at each trap address, whether or not there is a patch to be performed. In addition, it requires RAM of large size if it is desired to make a large number of trap addresses available within the control program, because each patch stored in RAM contains not only corrected or modified instructions but also a copy of the entire program segment situated between the trap address concerned and the address of the instructions that are to be corrected or modified.

In order to mitigate the drawbacks of that known technique, control program patching apparatus has been proposed comprising, in particular:

means for storing a plurality of trap addresses, each associated with the address of one of the patch routines;

a means for comparing the address of the control program contained in the program counter with each of the trap addresses contained in the storage means; and means for diverting the control program if the comparator means deliver a positive comparison, with diversion being to a patch routine whose address is associated with the trap address concerned by the positive comparison.

That known apparatus operates as follows: on each instruction cycle, it is determined whether the instruction being executed is one of the trap addresses, and on detecting a match, the logic of the apparatus changes the current address in the program counter, replacing it with the address of the patch routine.

That known apparatus presents several advantages over the above-mentioned known technique. In particular, it makes it possible to provide a patch at any address in the control program (since it is possible to select which addresses are stored as trap addresses in the storage means), while minimizing the size of the RAM required for the patches (since the patch routines contain only those instructions that have been corrected or modified, and is the means for storing the trap addresses take up little memory space).

However, as presently designed, that known apparatus does not deliver performance that is as good as desired since it makes it possible to provide only a limited number of corrections to the control program.

In order to guarantee the operating speed of the processor and restrict the area of silicon required, the number of trap addresses with which the comparator means can compare the address contained in the program counter must necessarily be limited.

Thus, at present, only a small number of correction opportunities are available (e.g. eight). In other words, only a few patch routines can be used with a given control program. Unfortunately, it often happens that it is desirable to provide a larger number of corrections or modifications to the control program.

OBJECTS AND SUMMARY OF THE INVENTION

A particular object of the invention is to mitigate this major drawback of the above-mentioned known apparatus.

More precisely, one of the objects of the present invention is to provide apparatus for patching the control program in a processor that makes it possible to increase the number of corrections or modifications that can be applied to the control program without that requiring an increase in the operating power of the processor.

The invention achieves that object, and others that appear below, by means of apparatus for patching the control program of a processor, the apparatus being of the type in which the processor executes a control program stored in non-volatile memory and has access to a plurality of patch routines each designed to be executed in the place of a sequence of at least one instruction in said control program, said apparatus comprising:

storage means for storing a plurality of trap addresses, each associated with the address of one of the patch routines;

comparator means for comparing the control program address contained in the program counter with the trap addresses contained in said storage means;

diversion means for diverting the control program to a patch routine in the event of said comparator means providing a positive comparison, the address of said patch routine being the address which is associated with the trap address that gave rise to the positive comparison;

wherein each trap address is also associated with one of the possible operating states of said processor;

wherein said apparatus further includes selection means for selecting a predetermined number of trap addresses from the trap addresses stored in said storage means so that the selected trap addresses are those which are associated with the current operating state of said processor; and wherein said, comparator means compare the address contained in the program counter only with said selected trap addresses.

The general principle thus consists in selecting which patch routines are actually available for use dynamically as a function of the present operating state of the processor. In other words, at a given instant, only certain trap addresses (referred to as the "selected" trap addresses) are compared with the address contained in the program counter and will cause the corresponding patch to be executed in the event of the comparison being positive.

The inventor has started from the observation that as a general rule, any one patch routine is used in only one particular one of the operating states of the processor. Consequently, by omitting a patch routine from the selection when the processor is not in the corresponding operating state, the comparator means are spared from making comparisons that cannot be useful.

The apparatus of the present invention which conserves all of the advantages of the above-mentioned known apparatus also provides much better performance since with given hardware resources and operating conditions, it provides a greater number of patch routines.

By way of comparison, assuming that at a given instant the apparatus of the present invention and the above-mentioned known apparatus are both capable of handling N different trap addresses (in general N=8), then the total number of trap addresses that can be handled throughout execution of the control program is:

likewise equal to N in the above-mentioned known apparatus, since in that case the trap addresses are unchanging;

greater than N for the apparatus of the present invention, since a plurality of sets of N trap addresses can be selected. Under such circumstances, the maximum value of the total number of trap addresses is: $N_{max}=N \times E$ where E is the number of distinct operating states that the processor can present.

Advantageously, each possible operating state of the processor corresponds to a distinct operating mode or to a distinct operating stage.

Each operating mode, or stage as the case may be, corresponds to executing a portion, or a sub-portion as the case may be, of the control program. These portions or sub-portions are generally mutually exclusive in time.

Preferably, said storage means contain a first table associated each trap address with the address of a patch routine and with one of the possible operating states of said processor.

Preferably, said selection means contain a second table storing said selected trap addresses.

This second table serves essentially to perform the same function as the single table in the prior art apparatus. It is recalled that in the prior art, a single table is necessary since patch opportunities are unchanging. In contrast, in the invention, patch opportunities are variable, with this being achieved, for example, by dynamically modifying the contents of the second table using elements from the first table.

Advantageously, said second table associates each selected trap address with one of the patch routines.

Advantageously, the contents of said first table and/or the contents of said second table are modified under the control of another processor.

In this manner, the memory size of the storage means (generally RAM) is limited. By way of example, the other processor may be a microcontroller.

Advantageously, because said control program includes a portion of code for detecting a change of state, which portion is executed before each change in the current operating state of the process, said selection means comprise an additional portion of code designed to be executed by the processor after executing said portion of code for detecting a change of state, execution of said additional portion of code performing said selection of patch addresses as a function of the current operating state of the processor.

Thus, before each switchover to a new operating state of the processor, a new set of trap addresses is selected, suitable for the new operating state.

In a first particular embodiment of the invention, said additional portion of code is included in said control program, in or following said portion of code for detecting a change of state.

This first embodiment corresponds essentially to the case where a decision to implement the invention is taken at the time the control program is designed. In this case, the additional code portion forms a part of the control program.

In a second particular embodiment of the invention, said additional portion of code is included in a patch routine that is always selected and whose address is associated with a trap address situated within the control program in or following said portion of code for detecting a change of state.

This second embodiment corresponds essentially to the case where it is decided to implement the invention after the control program has been designed. Under such circumstances, the additional code portion is to be found in a patch and does not form part of the control program.

Advantageously, at least one of said selected trap addresses is selected regardless of the current operating state of said processor.

For example, a trap address is permanently selected if it is associated with the address of a patch routine serving to correct or modify a common portion (or sub-portion) of the control program, i.e. a portion (or sub-portion) that might be run whatever the operating state of the processor.

In a preferred embodiment of the invention, said apparatus includes at least one set of at least two patch routines capable of self-activating, and including a starting patch routine, each set being such that:

the starting patch routine is always the first patch routine to be selected from amongst the patch routines of said set; and each patch routine of said set includes additional instructions which, on being executed, serve to enable said selection means to select another patch routine of said set instead of said patch routine.

Thus, a set of self-activating patch routines makes it possible to take corrective action on the control program in a plurality of different ways.

Advantage can be taken of the fact that certain patch routines can take over from one another. Only one hardware resource is used by all of the patch routines in the same self-activating set. In other words, taken together, they correspond to only one selected trap address, which selected trap address is modified each time a new patch routine in the set is activated by the preceding patch routine.

In addition, this self-activation technique is highly advantageous in terms of memory space. A set of short patch routines can replace a single patch routine that needs to be long because it includes not only the corrected or modified instructions contained in the patch routines of said set, but also a full copy of the program segments situated between successive patch routines in the set.

Advantageously, the last-executed patch routine of said set includes additional instructions which, on being executed, cause said selection means to select the starting patch routine of the set instead of said last-executed patch routine.

The initial context is thus guaranteed when executing the last patch routine of the set. In this way, the set of patch routines can be performed a plurality of times in succession. This corresponds in particular to the case of a mode or a stage that is performed iteratively.

Advantageously, the patch routines in the same set are associated with the same operating state of said processor.

In other words, in this particular case, the patch routines of a set seek to correct or modify instructions in the same portion (or sub-portion) of the control program.

Advantageously, at least one set includes at least one patch routine including test instructions such that as a function of the result of said test, said routine constitutes:

either a last patch routine for said set;

or else a patch routine preceding another patch routine of said set.

Thus, depending on the results of the test(s) performed in one or more patch routines, various different instruction sequences can correspond to the same set of patch routines.

BRIEF DESCRIPTION OF THE DRAWINGS

Other characteristics and advantages of the invention appear on reading the following description of a preferred embodiment of the invention, given by way of non-limiting indication, with reference to the accompanying drawings, in which:

FIG. 4 is a block diagram of a particular embodiment of the patch apparatus of the invention;

FIGS. 5 and 6 show a particular implementation of tables I and II that appear in FIG. 3;

FIG. 7 is a table giving an example of patch routine selection as a function of the operating state of the processor;

FIG. 8 is a summary diagram for explaining the principle on which patch routines are self-activating in accordance with the invention; and FIG. 9 is a simplified flow chart explaining how a test can be performed within one of the self-activating patch routines.

MORE DETAILED DESCRIPTION

The invention thus relates to apparatus for patching a control program in a processor.

Figure 1:
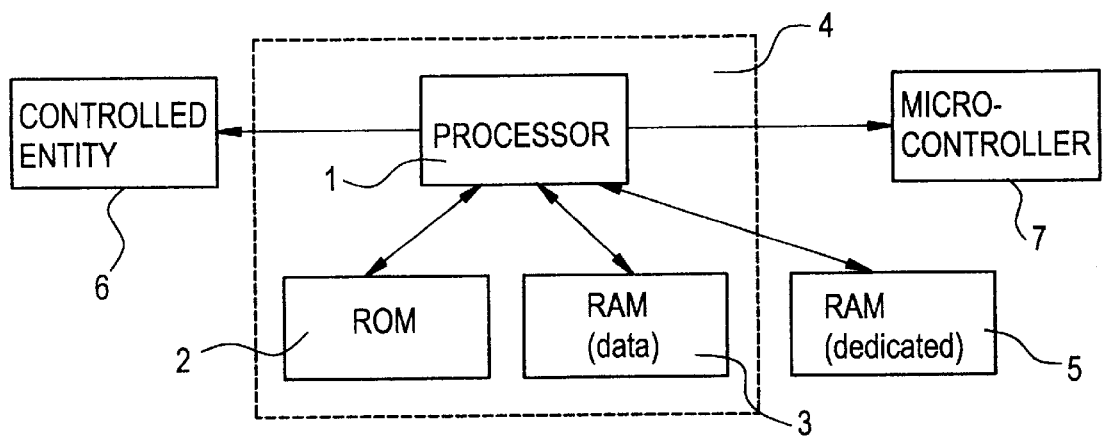
FIG. 1 is a block diagram summarizing conventional processor operation.

In conventional manner, as shown in FIG. 1, a processor 1 executes a control program stored in non-volatile memory (ROM) 2. It also uses a read/write data memory (RAM) 3, and possibly dedicated RAM 5. In general, the processor 1, the ROM 2, and the data RAM 3 are to be found on the same chip 4, while the dedicated RAM 5 is external to the chip 4. The processor 1 can control one or more entities 6 (e.g. a radio transceiver component) and may itself be controlled by another processor (e.g. a microcontroller 7). It is clear that other configurations could be envisaged, and that the present invention can be implemented with each of them.

Figure 2:
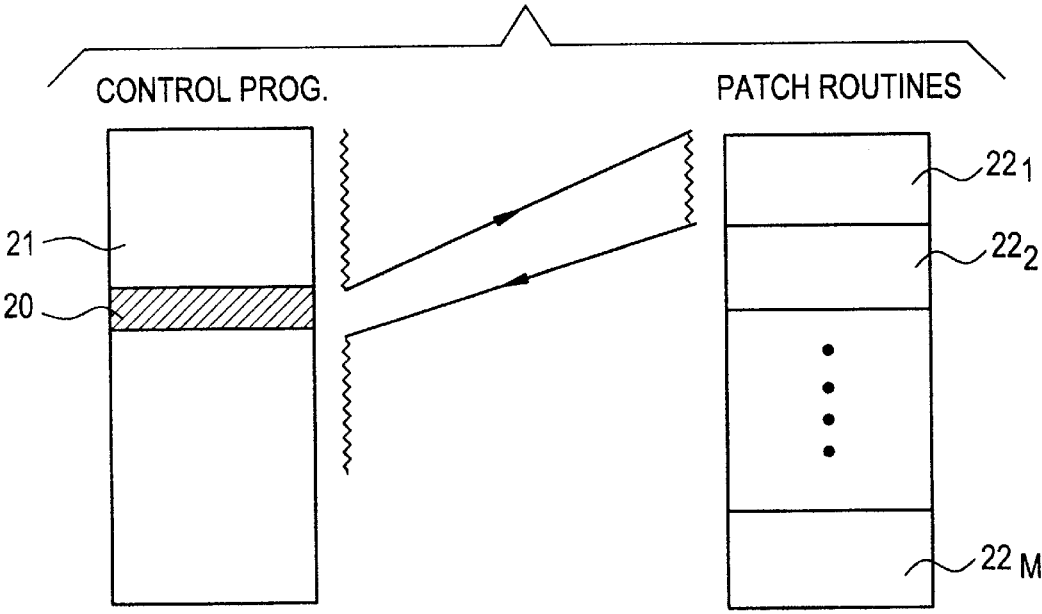
FIG. 2 is a block diagram explaining the way in which diversion is implemented in the patching apparatus of the invention.

FIG. 2 is a block diagram explaining the principle of diversion as implemented in the patch apparatus of the invention.

It is recalled that diversion is based on performing a patch routine $22_1$ when an instruction or a sequence of instructions 20 in the control program 21 is erroneous or needs to be modified. The patch $22_1$ that is executed is selected in appropriate manner from a plurality of patches $22_1$ to $22_M$, e.g. stored in the dedicated RAM 5. The size of each patch routine depends on the correction or modification it provides.

Figure 3:
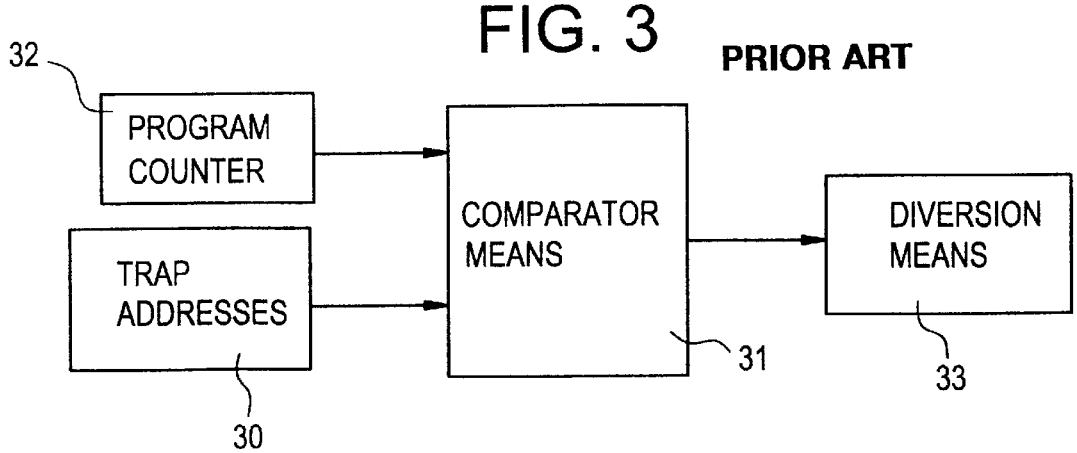
FIG. 3 is a block diagram of prior art patching apparatus.

As shown in the block diagram of FIG. 3, prior art patch apparatus comprises:

storage means 30 (e.g. a stack of registers) containing trap addresses, each associated with the address of one of the patch routines;

comparator means 31 for comparing the address of the control program as contained in the program counter 32 with each of the trap addresses contained in the storage means 30; and means 33 for diverting the control program in the event of the comparator means 31 providing a positive comparison, the program being diverted to the patch routine whose address (destination address) is associated with the trap address ("starting" address) that gave rise to the positive comparison result.

A particular embodiment of the patch apparatus of the invention is described below with reference to the block diagram of FIG. 4. This embodiment comprises comparator means 31 and diversion means 33 identical to those included in the prior art apparatus (cf. FIG. 3). However it also comprises:

storage means 40 for storing the set of trap addresses, e.g. in the form of a first table (written Table I below);

selection means 41 for selecting some of the trap addresses, so that the selected trap addresses are those associated with the current operating state of the processor; and storage means 42 for storing the selected trap addresses, e.g. in the form of a second table (written Table II below).

By way of example, Tables I and II are stored in the data RAM 3.

The comparator means 31 compare the address contained in the program counter 32 solely with the selected trap addresses in Table II. Thus, in the present invention, the address contained in the program counter 32 is not compared with all of the possible trap addresses of Table I.

In order to enable the selection means 41 to select trap addresses as a function of the current operating state of the processor, each trap address is also associated in Table I with one of the possible operating states of the processor.

As shown in FIG. 5, in a particular embodiment, Table I has four columns respectively concerning:

an event causing switchover to a predetermined operating state;

a row number in Table II;

a starting address, i.e. a trap address in the control program; and a destination address, i.e. an address of a patch routine.

A single event can be associated with up to N different row numbers, and thus N distinct pairs of addresses, where N is the total number of rows in Table II (e.g. N=8). This means that for a given event, i.e. for a given operating state of the processor, there exist up to N opportunities for correcting or modifying the control program.

Numerous events exist. Each of them corresponds to data being received that modifies the running of the control program. For example, this data might be sent by the microcontroller 7 or by the controlled entity 6.

Each possible operating state of the processor corresponds, for example, to a distinct operating mode of the processor, e.g. acquisition mode, tracking mode, etc. Each mode of operation corresponds to executing a particular portion of the control program.

It is also possible to envisage making each possible operating state of the processor correspond to a distinct stage of operation. As a general rule, an operating mode of the processor can generally itself be subdivided into successive operating stages. Each operating stage corresponds to executing a particular sub-portion of the control program. It is clear that in this manner the total number of corrections and/or modifications available can be increased since the contents of Table II is modified more often (several times during a single mode of operation).

It is even possible to envisage combining the two definitions given above. Each possible operating state of the processor can then correspond, as appropriate, to a distinct mode or operating stage of the processor.

As shown in FIG. 6, in a particular embodiment, Table II has three of the four columns of Table I, namely the columns concerning:

row number in Table II;

starting address, i.e. a trap address; and destination address, i.e. the address of a corresponding patch routine.

Thus, when an event corresponding to a change in the current operating state of the processor occurs, the selection means 41:

take the event into account;

read from Table I the pair(s) of addresses (starting address, destination address) associated with the event, and for each pair of addresses the associated row number in Table II; and copies into Table II, at the appropriate row number, each of the address pairs read (starting address, destination address).

This operation of the selection means 41 corresponds to the processor executing a portion of additional code after executing a portion of code for detecting the change of state. The control program comprises a portion of code for detecting a change of state which is executed before each change in the current operating state of the processor.

The additional portion of code can be located:

either in the control program, in or following the portion of code for detecting a change of state;

or else in a patch routine that is always selected (referred to as a routine for dynamic management of patch routines) and whose address is associated with a trap address itself situated in the control program in or following the portion of code for detecting a change of state.

Provision can be made for one trap address to be selected permanently, e.g. if the corresponding patch routine serves to correct or modify a portion of the control program that is common to all of the operating modes. It should be observed that the routine for dynamic management of patch routines, if one exists, is a routine of the type possessing an address (destination address) associated with a trap address (starting address) that is always selected.

FIG. 7 is a table giving an example of patch routines selected as a function of the operating state of the processor. In this purely illustrative example, two routines A and B may be permanently available for execution. Patch routine C may be available when the processor is in a first operating mode (mode No. 1). Routines D and F may be available when the processor is in a second operating mode (mode No. 2). Routines E and G may be available when the processor is in a third operating mode (mode No. 3). Finally, when the processor is in a fourth operating mode (mode No. 4), it requires no correction or addition.

In order to reduce the memory space occupied by Table I, provision can be made for its contents to be modified over time by the microcontroller 7 (or more generally by some other processor), and not merely downloaded when the machine is booted.

The principle whereby patch routines can be self-activated in accordance with the invention is described below with reference to FIGS. 8 and 9.

The block diagram of FIG. 8 shows, by way of example, a set E of three patch routines R1, R2, and R3 that are capable of being self-activated. One of the patch routines, referred to as the starting patch routine R1 is always the first routine in the selected patch. Each patch routine in the set includes additional instructions that, when executed, enable the selection means 41 to select a different patch routine in the set instead of the patch routine in question. Thus, when the starting routine R1 is executed, that enables the selection means 41 to replace the trap address corresponding to the routine R1 in the Table II with the trap address corresponding to the routine R2. Similarly, the trap address of routine R2 can be replaced with that for routine R3. In other words, routine R2 is selected instead of routine R1 Similarly, routine R3 can be selected instead of routine R2 once routine R2 has been executed.

It will thus be understood that the trap addresses corresponding to the patch routines R1, R2, and R3 in a given set E occupy only a single row in Table II in succession. Generally, self-activation takes place during a single operating state of the processor.

If the set E of patch routines is liable to be executed a plurality of times in succession during a single operating mode or stage, then it is appropriate to ensure that the last-executed patch routine R3 in the set E includes additional instructions, which on being executed, enable the selection means 41 to select the starting patch routine R1 again instead of the last patch routine R3. In other words it is appropriate to restore the context for the first iteration.

Provision can also be made to perform a test within one (or more) of the self-activating patch routines. Thus, as a function of the result of the test, the particular sequence of self-activating patch routines need not always be the same. In other words, the routine including the test can constitute either the last patch routine or same intermediate patch routine.

In the example of FIG. 9, the routine R3 includes a test. Two sequences are then possible, namely: R1-R2-R3-R4-R1- . . . or R1-R2-R3-R1- . . . .

It is clear from reading the above that, without going beyond the ambit of the present invention, the person skilled in the art can design flow charts for sequences of self-activating patch routines that are much more complex.

I claim:

1. Apparatus for patching the control program of a processor, the apparatus being of the type in which the processor executes a control program stored in non-volatile memory and has access to a plurality of patch routines each designed to be executed in the place of a sequence of at least one instruction in said control program, said apparatus comprising:

a storage means for storing a plurality of trap addresses, each associated with the address of one of the patch routines;

comparator means for comparing the control program address contained in the program counter with the trap addresses contained in said storage means;

diversion means for diverting the control program to a patch routine in the event of said comparator means providing a positive comparison, the address of said patch routine being the address which is associated with the trap address that gave rise to the positive comparison;

wherein each trap address is also associated with one of the possible operating states of said processor;

wherein said apparatus further includes selection means for selecting a predetermined number of trap addresses from the trap addresses stored in said storage means so that the selected trap addresses are those which are associated with the current operating state of said processor; and wherein said comparator means compare the address contained in the program counter only with said selected trap addresses.

2. Apparatus according to claim 1, including at least one set of at least two patch routines capable of self-activating, and including a starting patch routine, each set being such that:

the starting patch routine is always the first is patch routine to be selected from amongst the patch routines of said set; and each patch routine of said set includes additional instructions which, on being executed, serve to enable said selection means to select another patch routine of said set instead of said patch routine.

3. Apparatus according to claim 2, wherein the last-executed patch routine of said set includes additional instructions which, on being executed, enable said selection means to select the starting patch routine instead of said last-executed patch routine.

4. Apparatus according to claim 2, wherein the patch routines in the same set are associated with the same operating state of said processor.

5. Apparatus according to claim 2, wherein at least one set includes at least one patch routine including test instructions such that as a function of the result of said test, said routine constitutes:

either a last patch routine for said set;

or else a patch routine preceding another patch routine of said set.

6. Apparatus according to claim 1, in which said control program comprises a portion of code for detecting a change of state, which portion of code is executed before each change of the current operating state of the processor, wherein said selection means comprise an additional portion of code designed to be executed by the processor after executing said portion of code for detecting a change of state, execution of said additional portion of code performing said selection of patch addresses as a function of the current operating state of the processor.

7. Apparatus according to claim 6, wherein said additional portion of code is included in said control program, in or following said portion of code for detecting a change of state.

8. Apparatus according to claim 6, wherein said additional portion of code is included in a patch routine that is always selected and whose address is associated with a trap address situated within the control program in or following said portion of code for detecting a change of state.

9. Apparatus according to claim 1, wherein said storage means contain a first table associated each trap address with the address of a patch routine and with one of the possible operating states of said processor.

10. Apparatus according to claim 9, wherein the contents of said first table and/or the contents of said second table are modified under the control of another processor.

11. Apparatus according to claim 1, wherein said selection means contain a second table storing said selected trap addresses.

12. Apparatus according to claim 11, wherein said second table associates each selected trap address with one of the patch routines.

13. Apparatus according to claim 1, wherein each possible operating state of the processor corresponds to a distinct operating mode or to a distinct operating stage.

14. Apparatus according to claim 1, wherein at least one of said selected trap addresses is selected regardless of the current operating state of said processor.

* * * * *